(12) United States Patent
Hsieh

(10) Patent No.: US 9,217,838 B2
(45) Date of Patent: Dec. 22, 2015

(54) HEAT SINK RETENTION IN AN OPTICAL COMPONENT

(71) Applicant: FINISAR CORPORATION, Sunnyvale, CA (US)

(72) Inventor: Cindy Hsin-I Hsieh, Los Altos, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 385 days.

(21) Appl. No.: 13/711,460

(22) Filed: Dec. 11, 2012

(65) Prior Publication Data
US 2014/0161399 A1  Jun. 12, 2014

(51) Int. Cl.
*H05K 7/20* (2006.01)
*G02B 6/42* (2006.01)
*H01L 23/473* (2006.01)

(52) U.S. Cl.
CPC .............. *G02B 6/4269* (2013.01); *G02B 6/426* (2013.01)

(58) Field of Classification Search
CPC .............. H05K 7/20218–7/20381; H05K 7/20409–7/20418; H05K 7/20009–7/202; H01L 23/473; H01L 23/367–23/3677; H01L 23/46–23/467; G06F 1/181–1/182
USPC .............. 361/679.46–679.54, 688–723; 361/676–678; 165/80.1–80.5, 104.33, 185; 174/15.1–15.3, 16.1–16.3, 547–548; 257/712–722, E23.088; 24/453, 24/458–459; 454/184; 312/236
See application file for complete search history.

(56) References Cited

U.S. PATENT DOCUMENTS

| | | | |
|---|---|---|---|
| 6,250,375 B1 * | 6/2001 | Lee et al. | 165/80.3 |
| 6,362,962 B1 * | 3/2002 | Lee et al. | 361/704 |
| 6,362,963 B1 * | 3/2002 | Lee et al. | 361/704 |
| 6,370,024 B1 * | 4/2002 | Lo | 361/704 |
| 6,421,242 B1 * | 7/2002 | Chen | 361/704 |
| 6,456,493 B1 * | 9/2002 | Lee | 361/704 |
| 6,466,443 B1 * | 10/2002 | Chen | 361/695 |
| 6,625,025 B1 * | 9/2003 | Duxbury et al. | 361/704 |
| 6,900,985 B2 * | 5/2005 | Chen et al. | 361/704 |
| 6,924,984 B2 * | 8/2005 | Lee et al. | 361/704 |
| 6,944,026 B2 * | 9/2005 | Lee et al. | 361/719 |
| 6,977,816 B2 * | 12/2005 | Lee et al. | 361/704 |
| 7,099,156 B2 * | 8/2006 | Chen et al. | 361/719 |
| 7,139,174 B1 * | 11/2006 | Nguyen et al. | 361/719 |
| 7,292,444 B1 * | 11/2007 | Yang et al. | 361/709 |
| 7,467,443 B2 * | 12/2008 | Lin | 24/459 |
| 7,480,146 B2 * | 1/2009 | Coleman et al. | 361/719 |
| 7,656,668 B2 * | 2/2010 | Lin | 361/710 |
| 2003/0011995 A1 * | 1/2003 | Liang | 361/704 |
| 2004/0108101 A1 * | 6/2004 | Dugas | 165/80.4 |
| 2004/0170001 A1 * | 9/2004 | Lee et al. | 361/719 |
| 2004/0228095 A1 * | 11/2004 | Lee et al. | 361/704 |
| 2005/0028967 A1 * | 2/2005 | Pedoeem et al. | 165/185 |

(Continued)

*Primary Examiner* — Anthony Haughton
*Assistant Examiner* — Razmeen Gafur
(74) *Attorney, Agent, or Firm* — Maschoff Brennan

(57) ABSTRACT

An example embodiment includes a retention spring. The retention spring includes a central portion, a coupling feature, and a spring arm. The central portion includes a heat sink contact surface configured to contact a detachable heat sink. The coupling feature is configured to mechanically couple the retention spring to an optical component. The spring arm connects the central portion to the coupling feature. The spring arm is configured to elastically deform to allow insertion of the detachable heat sink between the heat sink contact surface and a heat dissipation surface of the optical component and to at least partially retain the detachable heat sink against the heat dissipation surface.

20 Claims, 9 Drawing Sheets

(56) References Cited

U.S. PATENT DOCUMENTS

| | | | |
|---|---|---|---|
| 2007/0000650 A1* | 1/2007 | Nishimura | 165/121 |
| 2007/0025083 A1* | 2/2007 | Lin | 361/704 |
| 2007/0258216 A1* | 11/2007 | McBain et al. | 361/707 |
| 2008/0089033 A1* | 4/2008 | Lu et al. | 361/720 |
| 2008/0101033 A1* | 5/2008 | Cromwell et al. | 361/719 |
| 2008/0273301 A1* | 11/2008 | Lin | 361/687 |
| 2009/0323288 A1* | 12/2009 | Bernard | 361/715 |
| 2011/0315956 A1* | 12/2011 | Tischler et al. | 257/13 |
| 2012/0127665 A1* | 5/2012 | Prete et al. | 361/704 |
| 2014/0003457 A1* | 1/2014 | Shastri et al. | 372/36 |
| 2014/0133101 A1* | 5/2014 | Sunaga et al. | 361/699 |

* cited by examiner

HEAT SINK RETENTION IN AN OPTICAL COMPONENT

BACKGROUND

1. Field

Embodiments disclosed herein relate to optical components. More particularly, some example embodiments relate to heat dissipation of optical components.

2. Related Technology

Some data transmission involves the conversion of optical signals to electrical signals and/or electrical signals to optical signals. In some applications, the conversion occurs at a circuit board. For example, an optical fiber carrying one or more optical signals interfaces with a board-mounted optical engine. At the optical engine, the optical signals may be transduced from optical signals to electrical signals using optical receivers. The electrical signals may then be communicated along etched copper traces integrated into the circuit board to a destination. Likewise, electrical signals may be communicated along the copper traces to the optical engine. At the optical engine, the electrical signals may be transduced to optical signals by optical transmitters. The optical signals may then be further communicated along the optical fiber.

The transduction of the data between optical and electrical domains generates heat. In some circumstances, the heat generated may cause problems with proper function of the components involved in transduction. Additionally, excess heat may shorten the life or cause failure of components involved in the transductions. Moreover, the heat may leak to surrounding components on the circuit board and cause similar problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments disclosed herein relate to optical components. More particularly, some example embodiments relate to heat dissipation of optical components.

An example embodiment includes a retention spring. The retention spring includes a central portion, a coupling feature, and a spring arm. The central portion includes a heat sink contact surface configured to contact a detachable heat sink. The coupling feature is configured to mechanically couple the retention spring to an optical component. The spring arm connects the central portion to the coupling feature. The spring arm is configured to elastically deform to allow insertion of the detachable heat sink between the heat sink contact surface and a heat dissipation surface of the optical component and to at least partially retain the detachable heat sink against the heat dissipation surface.

Another embodiment includes a board-mounted optical assembly (BOA). The BOA includes an optical component, a detachable heat sink, and a retention spring. The optical component has a heat dissipation surface. The optical component defines an internal cavity and an opening configured to receive a pluggable connector. The detachable heat sink is configured to be retained against the heat dissipation surface. The retention spring is configured to be mechanically coupled to the optical component and to at least partially retain the detachable heat sink against the heat dissipation surface.

Another embodiment includes a system configured to retain a detachable heat sink against an optical component. The system includes a heat sink interface and a retention spring. The heat sink interface is integral to a first end of the optical component and configured to receive a fastener. The retention spring is configured to be mechanically coupled to the optical component at a second end. The retention spring is configured to apply a connecting force to at least partially retain the detachable heat sink against a heat dissipation surface of the optical component.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and, in part, will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description will be rendered by reference to specific embodiments thereof, which are illustrated in the appended drawings. It is appreciated that these drawings depict only typical embodiments of the invention and are, therefore, not to be considered limiting of its scope. The invention will be described and explained with additional specificity and detail through the use of the accompanying drawings in which.

DETAILED DESCRIPTION OF SOME EXAMPLE EMBODIMENTS

Embodiments disclosed herein relate to optical components. More particularly, some example embodiments relate to heat dissipation of optical components. One example embodiment includes a retention spring and a heat sink interface. The retention spring and the heat sink interface cooperate to partially retain a detachable heat sink against an optical component. The retention spring also includes a connector retainer that is configured to prevent retraction of a pluggable connector from the optical component. Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1A:
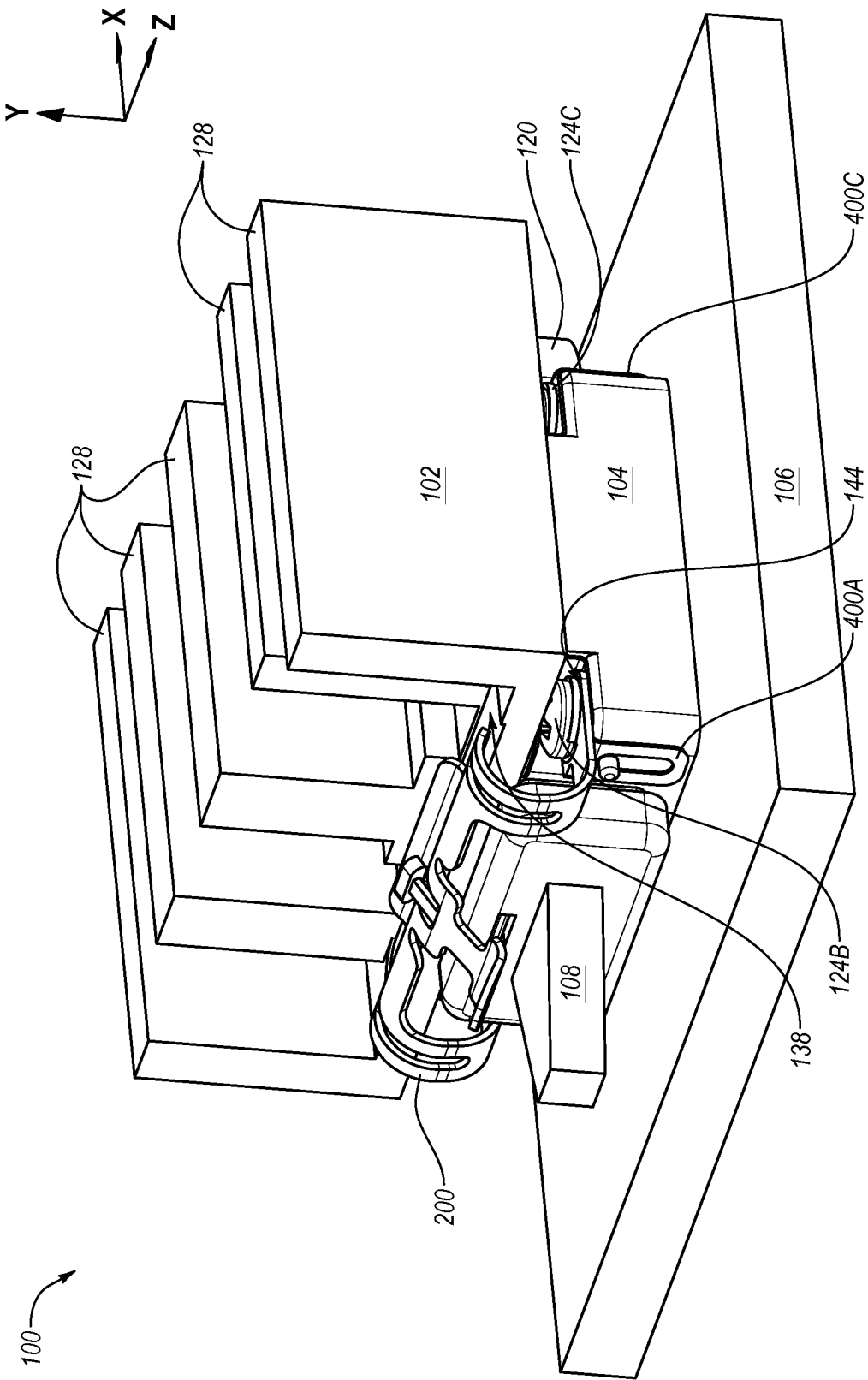
FIGS. 1A-1C illustrate an example board-mounted optical assembly (BOA) in which embodiments described herein may be implemented.
Figure 1B:
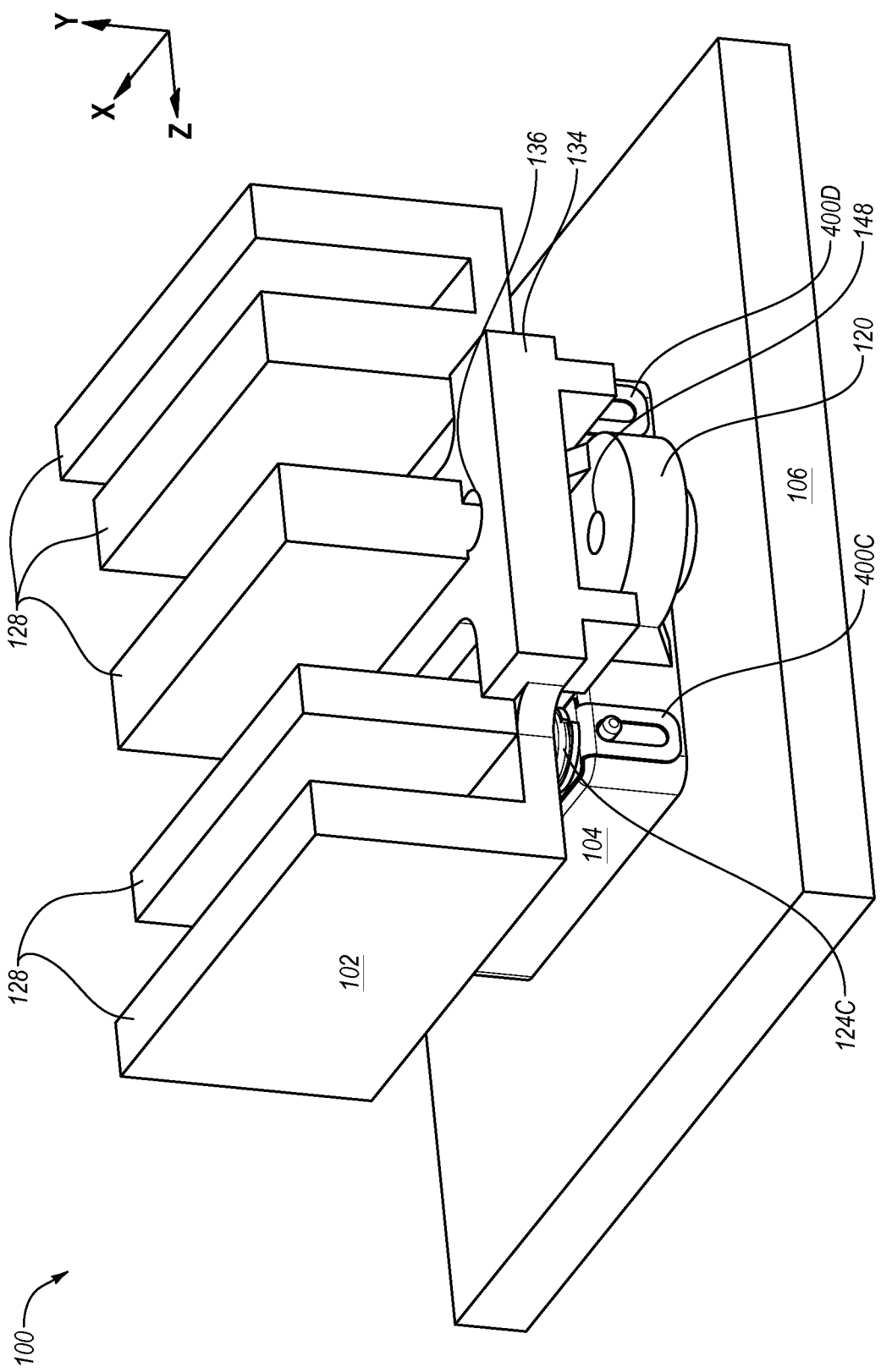
Figure 1C:
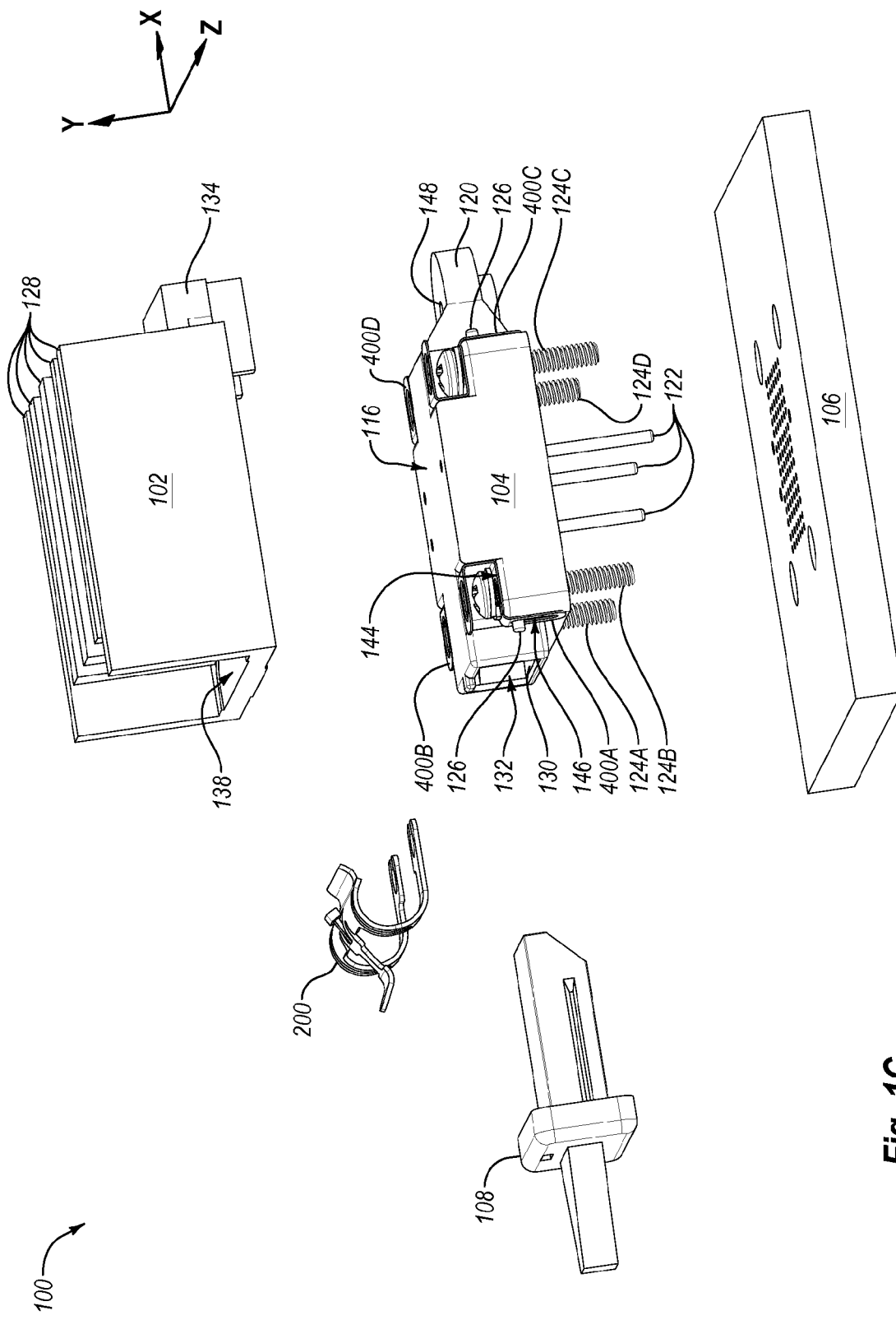

FIGS. 1A-1C illustrate an example board-mounted optical assembly (BOA) 100. FIGS. 1A-1C depict three views of the BOA 100. Specifically, FIG. 1A depicts a front perspective view of the BOA 100, FIG. 1B depicts a rear perspective view of the BOA 100, and FIG. 1C depicts a partially exploded perspective view of the BOA 100.

Generally, the BOA 100 includes an optical component 104 such as an optical engine that is designed for high-speed (e.g., 25 gigabits per second (G) or higher) optical interconnects between integrated circuits and/or between circuit boards. For example, the optical component 104 may include one or more components used in optical and/or electrical communication (e.g., a lens, a laser or other optical transmitter, a PIN photodiode or other optical receiver, monitor photodiodes, etc.) positioned within an internal cavity. The internal cavity is generally indicated by arrow 132 in FIG. 1C. The optical component 104 may also include an opening 130 (FIG. 1C) that may be configured to receive a pluggable connector 108. The pluggable connector 108 (FIGS. 1A and 1C) also includes one or more components used in optical and/or electrical communication that are selected and configured to operate with the components positioned within the internal cavity 132. For example, the pluggable connector 108 may be a 24 optical channel connector configured to interface with an optical lens configured to communicate 24 channels of data.

When the pluggable connector 108 is received in the optical component 104, optical signals can be communicated from a source (not shown) through the pluggable connector 108 and through the optical component 104 to a destination communicatively coupled to a circuit board (board) 106. The BOA 100 may operate at multiple data rates such as 10 G, 25 G, or a greater data rate, and may be communicatively coupled with one or more backplane connectors, waveguides, etc. to communicate the optical signals throughout a system or a network.

The optical component 104 may be mechanically coupled to the board 106 by one or more board fasteners 124A-124D (generally, board fastener 124 or board fasteners 124). In addition, each of the board fasteners 124 may be at least partially secured to the optical component 104 by a fastener retainer 400A-400D (generally, fastener retainer 400 or fastener retainers 400). The fastener retainers 400 may work with a shaft or a threaded portion of the board fasteners 124, which extend through the optical component 104 to secure the board fasteners 124 to the optical component 104, even when the board fasteners 124 are not mechanically coupled to the board 106. Accordingly, when the optical component 104 is not mechanically coupled to the board 106, the board fasteners 124 may continue to be engaged with the optical component 104. Some additional details of the fastener retainers 400 are provided with reference to FIG. 4 below.

Additionally, the BOA 100 shown in FIGS. 1A-1C includes three alignment pins 122 (FIG. 1C). The alignment pins 122 are configured to penetrate and pass through the optical component 104 to be received, at least partially, in the board 106. The alignment pins 122 enable alignment of the optical component 104 with the board 106. Inclusion of three alignment pins 122 in the illustrated embodiment is meant to be illustrative and not limiting; indeed, more or less than three alignment pins 122 may be provided in other embodiments.

During operation, e.g., communication of optical and electrical signals, the optical component 104 generates heat. Retention of heat within the optical component 104 may degrade performance of the active components positioned within the internal cavity 132, included in the pluggable connector 108, or on the board 106. Accordingly, dissipation of the heat may improve reliable performance as well as prolong the life of the BOA 100. Because the optical component 104 may be mechanically coupled to the board 106, dissipation of the heat may best be accomplished, at least in some embodiments, from a heat dissipation surface 116 (FIG. 1C) opposite the board 106. To dissipate heat from the optical component 104, a detachable heat sink (heat sink) 102 may be retained against the heat dissipation surface 116.

The heat sink 102 is generally a block of material including one or more fins 128 into which the heat from the optical component 104 is transferred. The fins 128 then transfer the heat to air or another fluid in contact with the fins 128, thus dissipating the heat generated in the optical component 104. The size and number of the fins 128, as well as the general structure and material of the heat sink 102 may vary without limitation.

The heat sink 102 is independently manufactured and configured to be releasably retained against the optical component 104. The ability to remove the heat sink 102 may provide a variety of benefits for the BOA 100. For example, ability to remove the heat sink 102 may increase interchangeability across multiple BOAs and/or multiple heat sinks, may increase access to the optical component 104 during maintenance or an upgrade, and may allow replacement of the heat sink 102 following an improvement in the design of the heat sink 102.

To retain the heat sink 102 to the optical component 104, the BOA 100 may include a heat sink interface 120 and/or a retention spring 200 (FIGS. 1A and 1C). Generally, the heat sink interface 120 may include a nut and/or may define an opening to receive a fastener. When the fastener is received in the opening or engaged with the nut, the heat sink interface 120 at least partially retains the heat sink 102 against the optical component 104. The retention spring 200 at least partially retains the heat sink 102 against the optical component 104. For example, the retention spring 200 applies a connecting force to the heat sink 102 to press the heat sink 102 against the heat dissipation surface 116. Some additional details of each of the retention spring 200 and the heat sink interface 120 are provided below.

In this and other embodiments, the heat sink interface 120 is integrally formed or otherwise attached to the optical component 104 at a first end. Accordingly, the heat sink 102 may also include rear portion 134 (FIGS. 1B and 1C) that may define a fastener opening 136 (FIG. 1B). The fastener opening 136 may substantially align with a second opening 148 (FIGS. 1B and 1C) defined by the heat sink interface 120. The fastener may pass through the fastener opening 136 in the rear portion 134 and be received in the second opening 148 defined in the heat sink interface 120 to at least partially secure the heat sink 102 to the optical component 104.

Additionally, the BOA 100 depicted in FIGS. 1A-1C includes the retention spring 200. The retention spring 200 may be configured to at least partially retain the heat sink 102 against the heat dissipation surface 116 of the optical component 104. In some embodiments, the heat sink 102 may include a flat portion 138 (FIGS. 1A and 1C) that the retention spring 200 contacts to apply a connecting force in a direction substantially towards the heat dissipation surface 116.

Additionally, the retention spring 200 may be configured to be mechanically coupled to the optical component 104. In some embodiments, the retention spring 200 may be mechanically coupled to the optical component 104 at a second end, opposite the first end having the heat sink interface 120. Accordingly, some subset of the board fasteners 124 may be configured to mechanically couple the retention spring 200 to the optical component 104. For example, as best illustrated in FIG. 1A, the board fastener 124 may penetrate the retention spring 200 and the optical component 104 such that when the board fastener 124 mechanically couples the optical component 104 to the board 106, it also mechanically couples the retention spring 200 to the optical component 104.

FIGS. 2A-2D illustrate some additional details of the retention spring 200. As mentioned above, the retention spring 200 is configured to at least partially retain a heat sink against an optical component. The retention spring 200 may be composed of any material that enables elastic deformation as generally described below, such as a plastic or metal. For example, in some embodiments, the retention spring 200 is composed of stainless steel 301, which may be half-hardened to generate a desired elastic deformation property and enable repeated (e.g., $10^6$ cycles) elastic deformations without yielding.

The general structure of the retention spring 200 includes a central portion 202, two coupling features 206A and 206B (generally, coupling feature 206 or coupling features 206), and two spring arms 208A and 208B (generally, spring arm 208 or spring arms 208) that connect the coupling features 206 to the central portion 202. This and other embodiments include a substantially symmetric structure for the retention spring 200. For example, the retention spring 200 includes two coupling features 206, one of which is connected to each side 210A and 210B (FIGS. 2A, 2C, and 2D) of the central portion 202 by one of the two spring arms 208. However, discussion of this embodiment is not meant to limit principles of the retention spring 200 and components included therein. Thus, another embodiment of the retention spring 200 may include one coupling feature 206 or three or more coupling features 206 configured to substantially perform functions discussed herein.

In this and other embodiments, the retention spring 200 includes a single piece of material in which the components (e.g., 202, 206, 208, 210, etc.) of the retention spring 200 are formed. Specifically, a first coupling feature 206A and the first spring arm 208A are integrally formed onto a first side 210A of the central portion 202. In addition, the second coupling feature 206B and the second spring arm 208B are integrally formed onto a second side 210B of the central portion 202. In embodiments in which the retention spring 200 includes a single piece of material, there may be no clear physical distinction between the central portion 202 and the spring arms 208. However, the central portion 202 and the spring arms 208 may be distinguished based on the function described herein.

The central portion 202 includes a heat sink contact surface 204. The heat sink contact surface 204 is configured to contact a heat sink, such as the heat sink 102 of FIGS. 1A-1C. The contact between the heat sink contact surface 204 and the heat sink enables the application of a connecting force that retains the heat sink against an optical component. For example, with combined reference to FIGS. 1A and 2A-2C, the heat sink contact surface 204 contacts the flat portion 138 of the heat sink 102 such that a connecting force can be applied to the heat sink 102.

In general, a connecting force is generated in the material of which the retention spring 200 is composed. For example, in this and other embodiments, the spring arms 208 are arced from the coupling features 206 to the central portion 202, thus the retention spring 200 includes a C-shaped cross section in the xy-plane (best illustrated in FIG. 2B). The heat sink contact surface 204 is substantially positioned in a first plane (i.e., a first xz-plane) and the coupling features 206 are substantially positioned in a second plane (i.e., a first xz-plane) parallel to the first plane. Between the heat sink contact surface 204 and the coupling features, a distance 218 (FIG. 2B) may be defined. Without a force imposed on the retention spring the distance 218 may have an initial length.

Figure 2A:
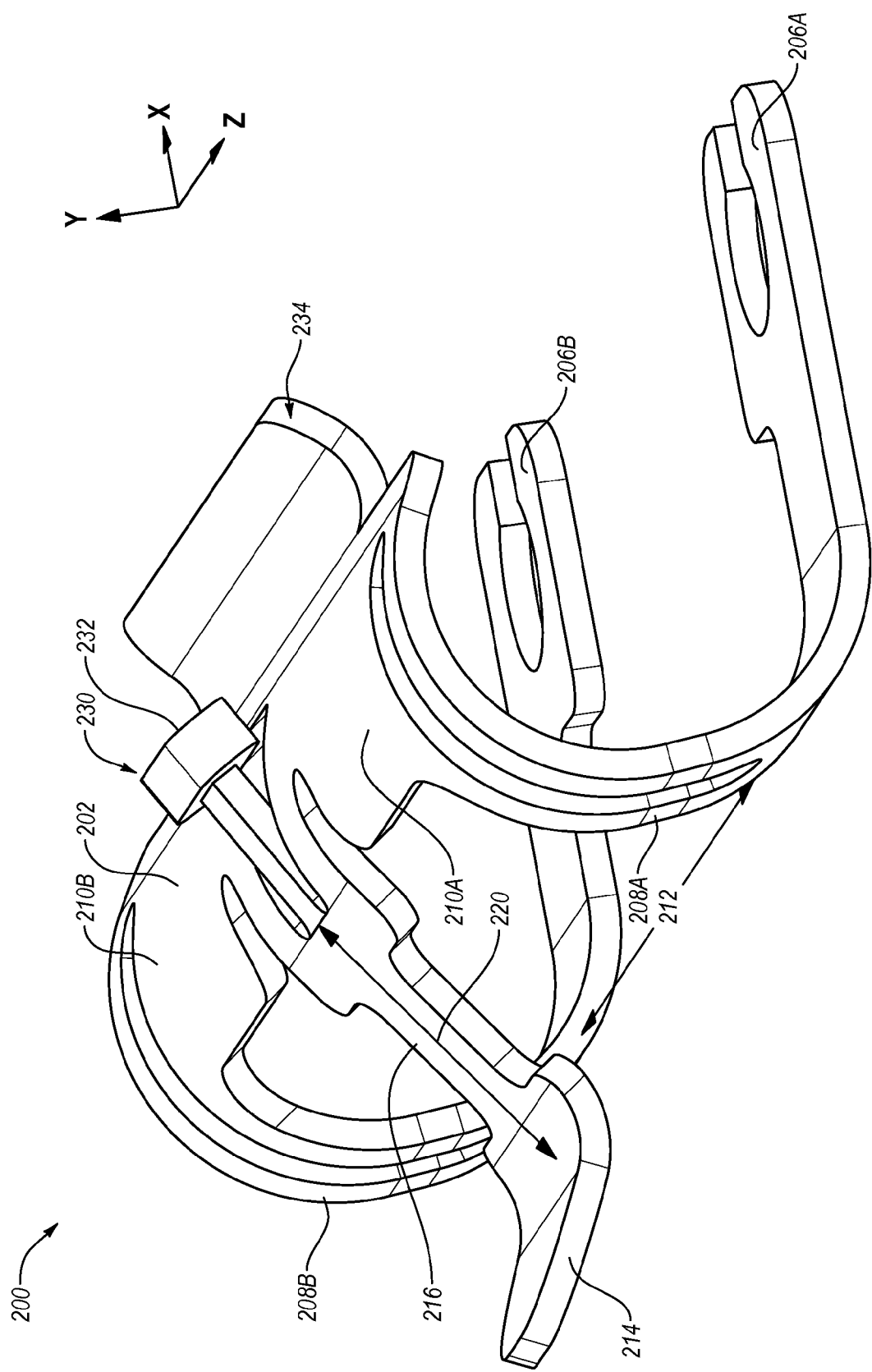
FIGS. 2A-2D illustrate a retention spring that may be implemented in the BOA of FIGS. 1A-1C.
Figure 2B:
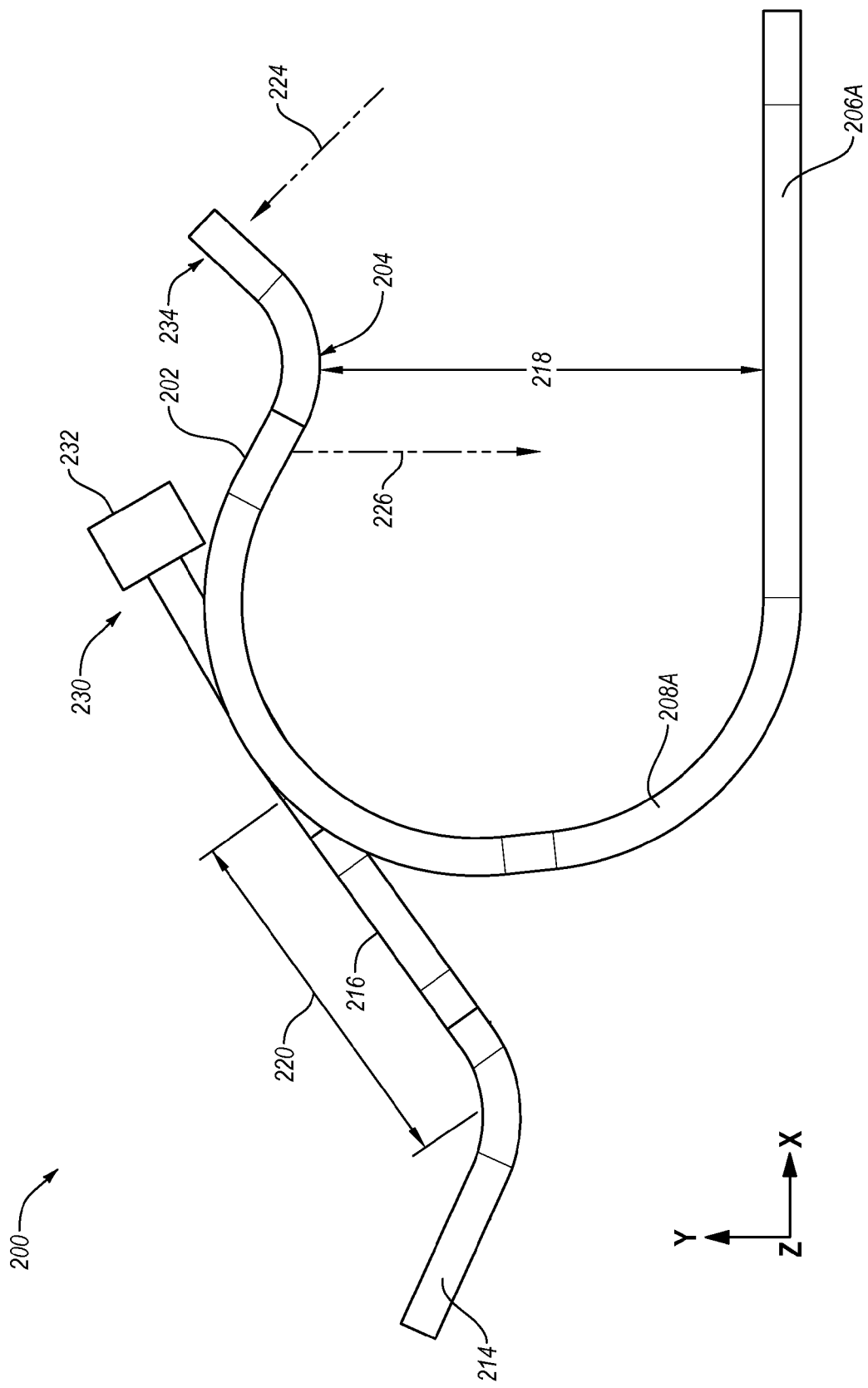

When a force, represented in FIG. 2B by arrow 224, is imposed on the retention spring 200, the spring arms 208 are configured to elastically deform to allow the distance 218 to increase. Because the spring arms 208 are configured to elastically deform under the force 224, following the removal of the force 224, the retention spring 200 acts to substantially return to the initial length. When a heat sink and an optical component are introduced into the volume between coupling features 206 and the heat sink contact surface 204 such that the distance 218 does not substantially return to the initial length, the connecting force is generated, which acts in substantially the negative y-direction. The connecting force is represented in FIG. 2B by arrow 226.

With combined reference to FIGS. 1A, 1C, 2B, and 2D, the elastic deformation of the spring arms 208 allows insertion of the heat sink 102 between the heat sink contact surface 204 and the heat dissipation surface 116 of the optical component 104. The heat sink contact surface 204 applies the connecting force 226 to the flat portion 138 of the heat sink 102 to at least partially retain the heat sink 102 against the heat dissipation surface 116.

Figure 2C:
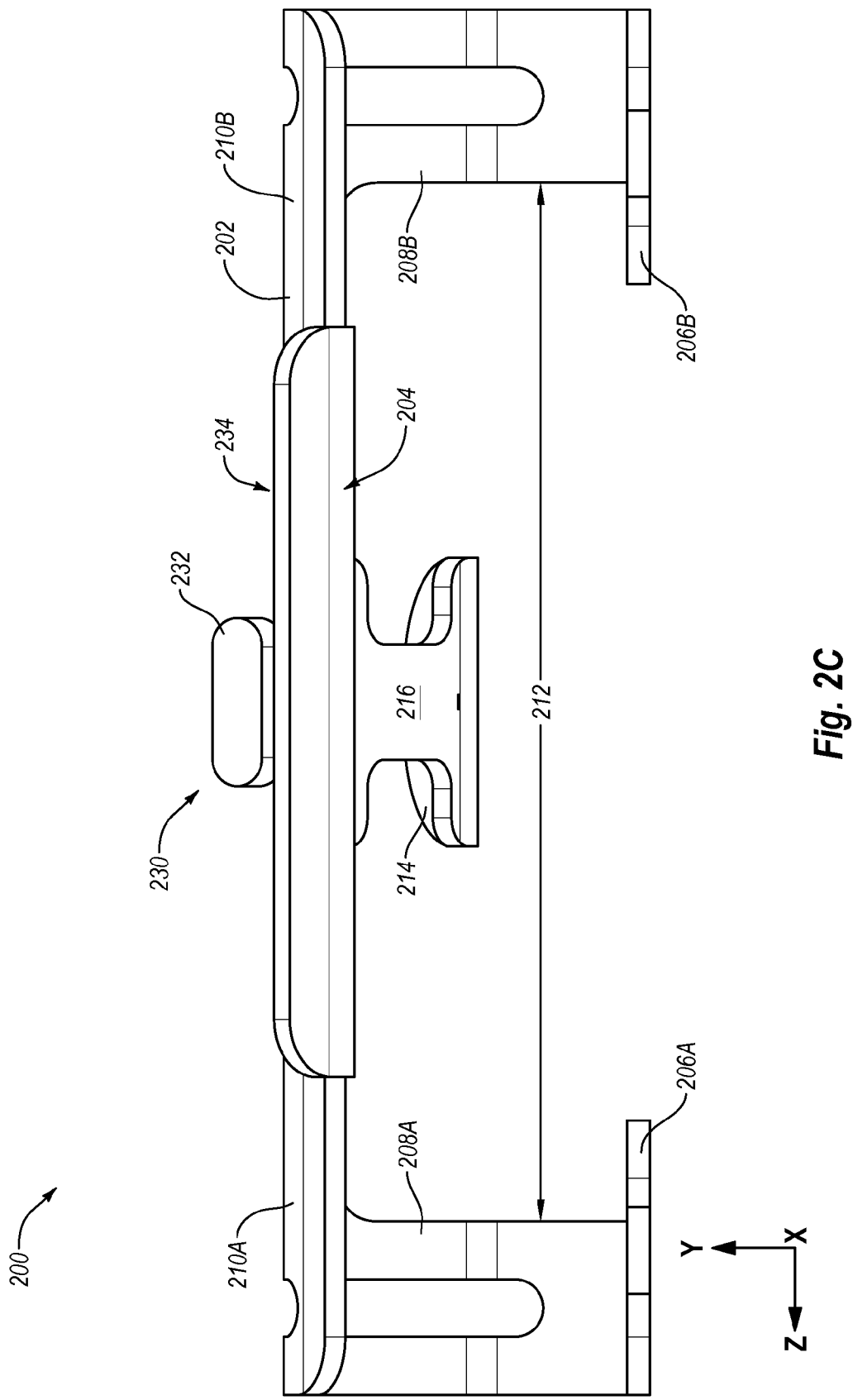
Figure 2D:
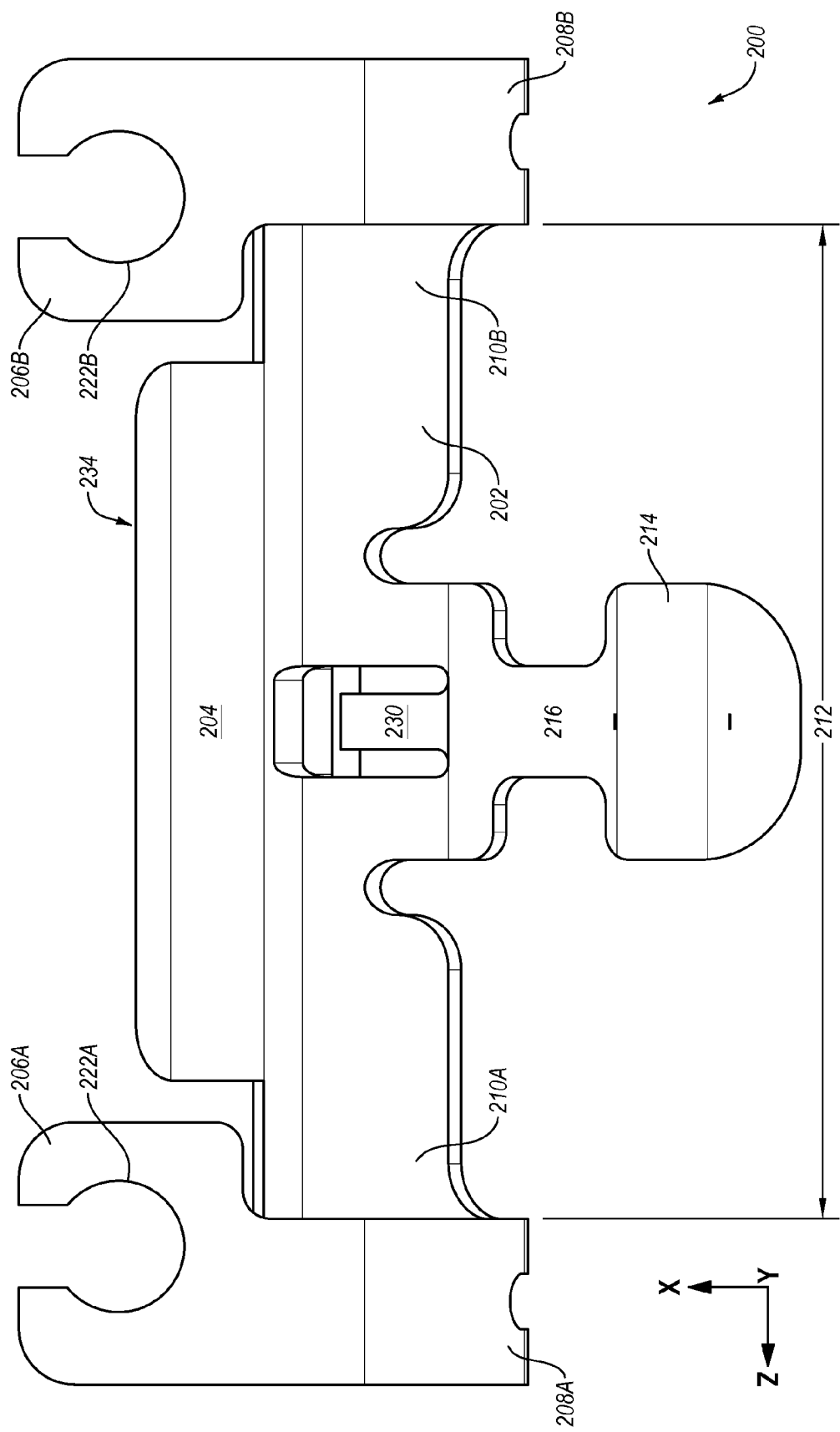

Referring back to FIGS. 2A-2D, the retention spring 200 also includes the coupling features 206. The coupling features 206 are configured to mechanically couple the retention spring 200 to an optical component. The coupling features 206 of the depicted embodiment are best illustrated in FIG. 2D. Referring specifically to FIG. 2D, the coupling features 206 define coupling openings 222A and 222B (generally, a coupling opening 222 or coupling openings 222). Each of the coupling openings 222 is configured to receive a respective fastener (not shown). Specifically, each of the coupling openings 222 may receive the respective fastener by moving the retention spring 200 in substantially the x-direction and/or thereby inserting the respective fastener into each of the coupling openings 222. By inserting the respective fastener into each of the coupling openings 222, the retention spring 200 may be mechanically coupled to an optical component.

For example, with combined reference to FIGS. 1C and 2D, the retention spring 200 may be mechanically coupled to the optical component 104 by a subset of the board fasteners 124. In FIG. 1C, a first board fastener 124A and a second board fastener 124B may be configured to mechanically couple the retention spring 200 to the optical component 104. The first and second board fasteners 124A and 124B may be positioned such that a threaded portion of the first and second board fasteners 124A and 124B are above a stepped surface 144 of the optical component 104. The retention spring 200 may then be positioned such that the coupling features 206 are aligned with the threaded portions of the first and second board fasteners 124A and 124B. The retention spring 200 can then be moved in the x-direction such that the threaded portions of the first and second board fasteners 124A and 124B are received in the coupling openings 222. When the first and second board fasteners 124A and 124B are secured to the board 106, the retentions spring 200 is also mechanically coupled to the optical component 104.

Referring back to FIGS. 2A-2D, in this and other embodiments, the central portion 202 includes a curved front portion 234 extending in substantially the positive x-direction and curved in substantially the y-direction. The heat sink contact surface 204 may include a bottom surface, i.e., having a smaller y-dimension, of the curved front portion 234. The curve of the curved front portion 234 may allow a heat sink to be inserted below the central portion 202 more easily than embodiments without the curved front portion 234 or may allow a user to apply a force to elastically deform the spring arms 208.

The retention spring 200 may be configured to allow a pluggable connector to be introduced between the spring arms 208. For example, in some embodiments, the first spring arm 208A is separated from the second spring arm 208B by a distance 212 (FIGS. 2A, 2C, and 2D). The distance 212 may be sized to enable a pluggable connector, such as the pluggable connector 108 of FIGS. 1A-1C, to be received between the first spring arm 208A and the second spring arm 208B.

The retention spring 200 may also include a connector retainer 216. The connector retainer 216 may further include a curved retainer end 214. The connector retainer 216 generally extends from the central portion 202 at least partially in the negative x-direction and at least partially in the negative y-direction. In some embodiments, the connector retainer 216 is substantially centered with respect to the z-dimension of the retention spring 200. The curved retainer end 214 may generally make up an end of the connector retainer 216 opposite the central portion 202. The curved retainer end 214 depicted in FIGS. 2A-2D extends in the negative x-direction and curves towards the positive y-direction.

With combined reference to FIGS. 1A and 2A-2D, functionally, connector retainer 216 is configured to apply a securing force to prevent retraction i.e., movement in the negative x-direction, of the pluggable connector 108 received in the optical component 104. For example, the pluggable connector 108 may be introduced into the internal cavity 132 through the opening 130 by moving the pluggable connector 108 in substantially the x-direction in relationship to the optical component 104. Once received in the internal cavity 132, an inadvertent force may act on the pluggable connector 108 moving the pluggable connector in the negative x-direction and disengaging the pluggable connector 108 from the optical component 104. To prevent movement of the pluggable connector 108 in the negative x-direction with respect to the optical component 104, the connector retainer 216 may contact the pluggable connector 108 and apply the securing force to maintain the pluggable connector 108 received in the internal cavity 132.

Figure 3:
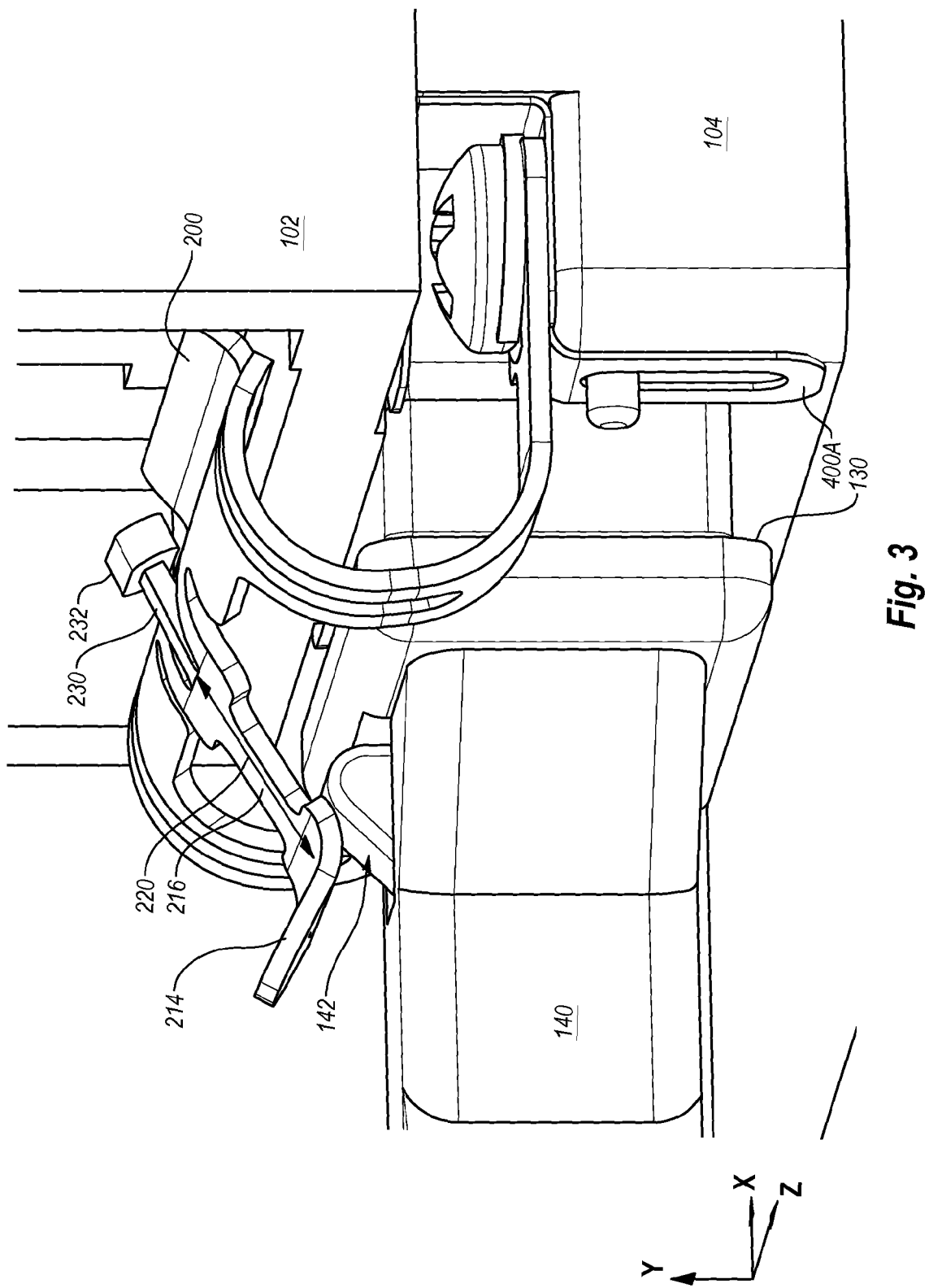
FIG. 3 illustrates an example pluggable connector that may be implemented with the retention spring of FIGS. 2A-2D.

In some embodiments, the pluggable connector 108 includes a protrusion on which the securing force acts. For example, FIG. 3 depicts a perspective view of a second pluggable connector 140 received in the optical component 104. The second pluggable connector 140 may generally correspond to the pluggable connector 108 described above and may include a protrusion 142. When the second pluggable connector 140 is introduced into the optical component 104, the protrusion 142 displaces the curved retainer end 214 in the positive y-direction. Once the second pluggable connector 140 is received in the optical component 104, the protrusion 142 is positioned between the curved retainer end 214 and the optical component 104 and the connector retainer 216 extends over the protrusion 142. When the second pluggable connector 140 moves in the negative x-direction with respect to the optical component 104, the connector retainer 216 applies the securing force to the protrusion 142 to maintain the second pluggable connector 140 engaged with the optical component 104.

With combined reference to FIGS. 2A-2D and FIG. 3, the connector retainer 216 may also include a retainer length 220 (FIGS. 2A, 2B, and 3). The retainer length 220 may be defined as a dimension between the central portion 202 and a point where the curved retainer end 214 contacts the protrusion 142. Because the protrusion 142 contacts the curved retainer end 214 under two circumstances, i.e. when the pluggable connector 140 is introduced to the opening 130 and when the pluggable connector 140 is retracted from the opening 130, the retainer length 220 may have more than one length.

The magnitude of a force sufficient to lift (i.e., move in the positive y-direction) the curved retainer end 214 may be based at least partially on the shape of the curved retainer end 214 and/or the protrusion 142. In some embodiments, the shape of the curved retainer end 214 and/or the protrusion 142 may be configured such that a force sufficient to lift the curved retainer end 214 when the pluggable connector 108 is introduced to the optical component 104 is less than the force sufficient to lift the curved retainer end 214 when the pluggable connector 108 is retracted from the optical component 104. This configuration of the curved retainer end 214 and/or the protrusion 142 may be implemented to prevent retraction of the pluggable connector 108 but to allow the pluggable connector 140 to be easily introduced to the opening 130.

In these and other embodiments, the curved retainer end 214 may be shaped such that retainer length 220 is longer when the pluggable connector 140 is introduced to the optical component 104 than when the pluggable connector 140 is retracted from the optical component 104. The shorter retainer length 220 provides a shorter moment arm and accordingly a higher force is required to lift the curved retainer end 214.

The retention spring 200 may also include a stiffener 230. The stiffener 230 may extend from the central portion 202 in a direction opposite the connector retainer 216. In this and other embodiments, the stiffener 230 extends in the positive x-direction and in the positive y-direction. The stiffener 230 generally acts to stiffen the connector retainer 216 and increase a retraction force needed to retract the pluggable connector from the optical component in comparison to embodiments without the stiffener 230.

In this and other embodiments, the stiffener 230 includes a stiffener end 232. The stiffener end 232 may be configured such that when the protrusion 142 acts on the connector retainer 216, the stiffener 230 rotates, moving the stiffener end 232 in substantially the negative y-direction. The stiffener end 232 may then contact the central portion 202. The contact between the stiffener end 232 and the central portion 202 forces the connector retainer 216 and/or the stiffener 230 to flex, thus increasing a retraction force needed to retract the pluggable connector from the optical component.

In some embodiments, the shape of the curved retainer end 214 and/or the protrusion 142 may be shaped such that the stiffener 230 only rotates enough to cause the connector retainer 216 to flex when the pluggable connector 140 is retracted. Thus, the stiffener 130 is inactive when the pluggable connector 140 is introduced into the opening 130 but active when the pluggable connector 140 is retracted from the opening 130. Accordingly, a retraction force may be greater than an introduction force.

Figure 4:
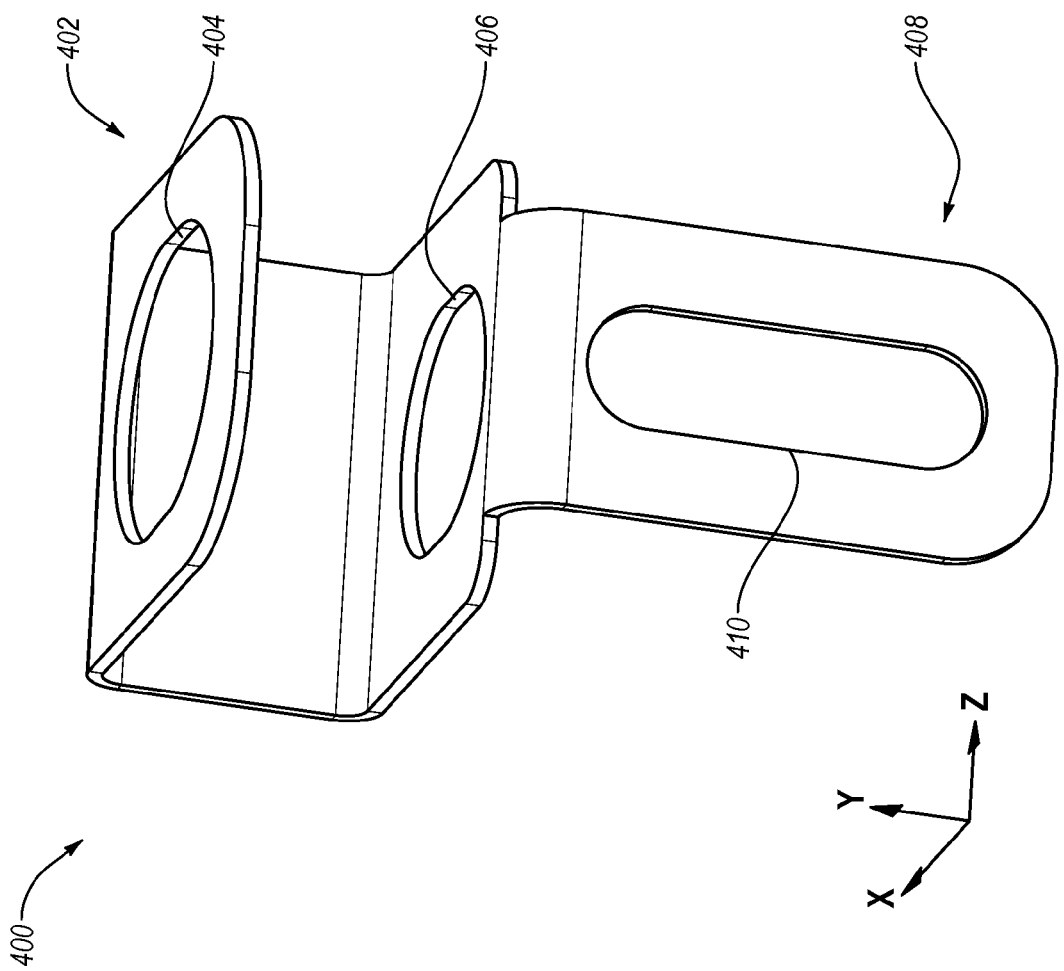
FIG. 4 illustrates an example fastener retainer that may be implemented in the BOA of FIGS. 1A-1C.

FIG. 4 illustrates some additional details of the fastener retainer 400 that may be included in the BOA 100 of FIGS. 1A-1C. The fastener retainer 400 may be configured to maintain engagement between a board fastener and an optical component. For example, the fastener retainer 400 can maintain engagement between the board fastener 124 and the optical component 104 of FIGS. 1A-1C.

With specific reference to FIG. 4, the fastener retainer 400 generally includes an upper portion 402 defining a first opening 404 and a second opening 406. The first opening 404 may be larger than the second opening 406 in some embodiments. For example, in this and other embodiments, the second opening 406 may be sized to correspond to a shaft or a threaded portion of a fastener while the first opening 404 may be sized to enable access to a head of the fastener. In alternative embodiments, the first opening 404 may have another shape. For example, the first opening 404 may include a slot or an ellipse, for instance, that enables a fastener to be inserted into the first opening 404 by moving the fastener in substantially the x-direction with respect to the fastener retainer 400.

With combined reference to FIGS. 1C and 4 and referring specifically to the second board fastener 124B in the following description, the fastener retainer 400 may maintain engagement between the board fastener 124 and the optical component 104 by constraining the motion of the board fasteners 124 with respect to the optical component 104. When the board fastener 124 is received in the fastener retainer 400 and the optical component 104, a head of the board fastener 124 is positioned between the first opening 404 and the second opening 406. Additionally, the upper portion 402 may be configured to be positioned on the stepped surface 144 of the optical component 104, such that a shaft or a threaded portion of the board fastener 124 can extend through the second opening 406 and into the optical component 104.

A lower portion 408 of the fastener retainer 400 may extend over a side surface 146 of the optical component 104. On the side surface 146, the optical component 104 may include a fastener retainer feature 126 configured to be introduced in a slot 410 defined in the lower portion 408. The slot 410 may constrain the motion of the fastener retainer 400 in the y-direction (i.e., constrain the motion to the fastener retainer 400 by interfering with the fastener retainer feature 126) and substantially prevent motion of the fastener retainer 400 in the z-direction.

Additionally, when the shaft or the threaded portion of the board fastener 124 is received in the second opening 406 and further received into the optical component 104, the board fastener 124 constrains the fastener retainer 400 in the x-direction and the z-direction. By constraining the fastener retainer 400 in the x-direction, the fastener retainer feature 126 maintains engagement in the slot 410. Thus, the fastener retainer 400 works with a shaft or a threaded portion of the board fasteners 124 to maintain engagement between the board fasteners 124 to the optical component 104 even when the board fastener 124 is not mechanically coupled to the board 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A retention spring comprising:
a central portion having a heat sink contact surface, the heat sink contact surface configured to contact a detachable heat sink;
a coupling feature configured to mechanically couple the retention spring to an optical component; and
a spring arm connecting the central portion to the coupling feature and configured to elastically deform to allow insertion of the detachable heat sink between the heat sink contact surface and a heat dissipation surface of the optical component and to at least partially retain the detachable heat sink against the heat dissipation surface.

2. The retention spring of claim 1, wherein the coupling feature is a first coupling feature and the spring arm is a first spring arm, the retention spring further comprising a second coupling feature and a second spring arm, the second spring arm connecting the second coupling feature to the central portion.

3. The retention spring of claim 2, wherein the first coupling feature is integrally formed onto a first side of the central portion and the second coupling feature is integrally formed onto a second side of the central portion.

4. The retention spring of claim 3, wherein the first coupling feature and first spring arm are separated from the second coupling feature and the second spring arm by a distance sized to enable a pluggable connector to be received between the first spring arm and the second spring arm.

5. The retention spring of claim 1, further comprising a connector retainer extending from the central portion at least partially away from the detachable heat sink, the connector retainer configured to prevent retraction of a pluggable connector received in the optical component.

6. The retention spring of claim 5, wherein the connector retainer is configured to apply a securing force against a protrusion formed on the pluggable connector.

7. The retention spring of claim 6, wherein the connector retainer comprises a curved retainer end configured such that when the pluggable connector is received in the optical component, the protrusion is positioned between the curved retainer end and the optical component.

8. The retention spring of claim 7, further comprising a stiffener configured to contact and flex against the central portion when a retraction force is applied to retract the pluggable connector from the optical component.

9. A board-mounted optical assembly (BOA) comprising:
an optical component having a heat dissipation surface, the optical component defining an internal cavity and an opening configured to receive a pluggable connector;
a detachable heat sink configured to be retained against the heat dissipation surface; and
a retention spring configured to be mechanically coupled to the optical component and to at least partially retain the detachable heat sink against the heat dissipation surface.

10. The BOA of claim 9, further comprising a plurality of board fasteners configured to mechanically couple the optical component to a circuit board, some subset of the plurality of board fasteners further configured to mechanically couple the retention spring to the optical component.

11. The BOA of claim 10, further comprising:
a plurality of fastener retainers configured to maintain engagement between the optical component and the plurality of board fasteners, each of the plurality of fastener retainers including a slot configured to receive one of a plurality of fastener retainer features protruding from the optical component, the fastener retainer features configured to at least partially constrain movement of one of the plurality of board fasteners with respect to the optical component.

12. The BOA of claim 9, wherein the retention spring comprises a retainer feature that extends from the retention spring, the retainer feature configured to prevent retraction of the pluggable connector from the optical component.

13. The BOA of claim 9, wherein the retention spring comprises:
a central portion having a heat sink contact surface along which a connecting force is applied to a flat portion of the detachable heat sink;
two coupling features positioned opposite the heat sink contact surface, the coupling features configured to mechanically couple the retention spring to the optical component; and two spring arms, each of the spring arms connecting one of the coupling features to the central portion, the spring arms configured to elastically deform to allow insertion of the detachable heat sink between the heat sink contact surface and the heat dissipation surface.

14. The BOA of claim 13, wherein the spring arms are integrally formed with the coupling features and the central portion, each of the spring arms being connected to one side of the central portion.

15. The BOA of claim 14, wherein the spring arms are arced from the coupling features to the central portion such that the retention spring has a C-shaped cross section.

16. A system configured to retain a detachable heat sink against an optical component, the system comprising:
  a heat sink interface integral to a first end of the optical component, the heat sink interface configured to receive a fastener; and
  a retention spring configured to be mechanically coupled to the optical component at a second end, the retention spring configured to apply a connecting force to at least partially retain the detachable heat sink against a heat dissipation surface of the optical component.

17. The system of claim 16, wherein the retention spring comprises:
  a central portion including a heat sink contact surface along which the connecting force is applied to the detachable heat sink;
  a coupling feature positioned opposite the heat sink contact surface, the coupling feature configured to mechanically couple the retention spring to the optical component;
  a spring arm connecting the coupling feature to the heat sink contact surface, the spring arm configured to elastically deform to allow insertion of the detachable heat sink between the heat sink contact surface and a heat dissipation surface; and
  a retainer feature that extends from the central portion, the retainer feature configured to maintain a pluggable connector received in the optical component in an engaged position.

18. A fastener retainer configured to maintain engagement between a board fastener and an optical component, the fastener retainer comprising:
  an upper portion defining a first opening and a second opening, the second opening being sized to receive a shaft of the board fastener such that when the board fastener is received in the second opening and further received in the optical component, a head of the board fastener is positioned between the first opening and the second opening and a shaft of the board fastener extends through the second opening and into the optical component; and
  a lower portion defining a slot configured such that a fastener retainer feature positioned on the optical component is introduced into the slot to constrain the motion of the fastener retainer and substantially prevent motion of the fastener retainer in at least one direction.

19. The fastener retainer of claim 18, wherein when the shaft of the board fastener is received in the second opening and further received into the optical component, the board fastener constrains the fastener retainer to maintain the fastener retainer feature in the slot.

20. The fastener retainer of claim 18, wherein the first opening comprises a shape that enables access to the head of the board fastener.

* * * * *